(12) United States Patent
Yang

(10) Patent No.: US 7,352,944 B2
(45) Date of Patent: Apr. 1, 2008

(54) LASER ALIGNMENT DEVICE

(75) Inventor: Dezhong Yang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 62 days.

(21) Appl. No.: 11/503,550

(22) Filed: Aug. 11, 2006

(65) Prior Publication Data

US 2007/0041692 A1    Feb. 22, 2007

(30) Foreign Application Priority Data

Aug. 16, 2005  (CN) .................... 2005 2 0074523

(51) Int. Cl.
  *G01C 15/00*   (2006.01)
  *G01C 5/00*    (2006.01)
  *B64C 17/02*   (2006.01)
  *G01B 11/26*   (2006.01)
  *G02B 6/00*    (2006.01)
(52) U.S. Cl. .................... 385/134; 33/286; 33/290; 33/291; 318/648; 356/138
(58) Field of Classification Search ............... 318/648; 33/290, 291
  See application file for complete search history.

(56) References Cited

U.S. PATENT DOCUMENTS 6,108,075 A  *  8/2000  Otomo et al. ............... 356/138

2003/0145474 A1 *  8/2003  Tacklind et al. ............. 33/290

* cited by examiner

*Primary Examiner*—Michelle Connelly-Cushwa
*Assistant Examiner*—Chris H. Chu
(74) *Attorney, Agent, or Firm*—McDermott Will & Emery LLP

(57) ABSTRACT

The present invention discloses a laser alignment device which has a simple structure, easy operation and economical utility, and which includes a casing, a laser emitting unit that is mounted in the casing and may emit a planar laser beam, a first mounting plane and a second mounting plane connected fixedly to the laser emitting unit, a first and a second electronic obliquity sensing units fixed on the first and the second mounting planes respectively, an automatic adjusting means, a first and a second surfaces both of which may contact with the settling surface of the laser alignment device, said first surface being connected moveably with said laser emitting unit through said automatic adjusting means, and a control circuit connected electrically with said first and second obliquity sensing units and said automatic adjusting means, at least the first one of said first and second obliquity sensing units being a double shaft obliquity sensing unit. Using this configuration, the same laser alignment device may form not only a horizontal planar laser beam but also a vertical planar laser beam, and may sense automatically the deviating degree from the horizontal or vertical for the planar laser beam adjust it automatically, so as to omit the step of adjusting manually and simplify its operation.

12 Claims, 3 Drawing Sheets

LASER ALIGNMENT DEVICE

CROSS-REFERENCE TO RELATED APPLICATIONS

This application claims priority to Chinese Application No. 200520074523.7 filed Aug. 16, 2005, the entire disclosure of which is incorporated herein by reference. Priority to this application is claimed under 35 U.S.C. 119, 120 and/or 365.

TECHNICAL FIELD

The invention relates to a laser alignment device, and more particularly, to a laser alignment device that can emit a planar laser beam to a target surface to form a laser line as a reference line for other operation.

BACKGROUND OF THE INVENTION

Currently, laser alignment devices are widely used in fields such as building engineering, home decorating and the like. U.S. Pat. No. 4,031,629 issued to Paluck on Jun. 28, 1977, discloses a laser alignment device in which a motor drives a laser beam to rotate to form a planar laser beam, thereby forming a straight laser line onto a target surface. The main body of the '629 patent is adjusted manually to horizontal, with the indication of level float, to ensure the laser line is in level. In some laser alignment devices instead of using a motor part to drive the laser to rotate, a type of linear lens is used for passing through a laser to convert it into a planar laser beam. Such a structure simplifies the internal structure of the laser alignment device and reduces energy consumption. A so-called linear lens can convert a beam of laser into a planar laser beam. U.S. Pat. No. 6,914,930 issued to Raskin on Jul. 5, 2005, sets forth a plurality of embodiments of linear lens. Both U.S. Pat. No. 4,247,809 issued to Nessel on Jan. 27, 1981 and U.S. Pat. No. 4,751,782 issued to Ammann on Jun. 21, 1988 disclose an automatic leveling laser alignment device with an electronic slope sensing element, which may omit manual leveling and simplify its operation.

However, the laser alignment devices of the above patents can only form a laser line on a target surface in a fixed direction such as a vertical surface, which limits the use of laser alignment devices.

The present invention is provided to solve the problems discussed above and other problems, and to provide advantages and aspects not provided by prior laser alignment devices of this type. A full discussion of the features and advantages of the present invention is deferred to the following detailed description, which proceeds with reference to the accompanying drawings.

SUMMARY OF THE INVENTION

The present invention is intended to provide a laser alignment device which has a simple structure, easy operation and economical utility, and which may form not only a horizontal planar laser beam, but also a vertical planar laser beam.

In one preferred embodiment of the present invention, a laser alignment device is disclosed comprising a casing, a laser emitting unit that is mounted in the casing and may emit a planar laser beam, a first mounting plane and a second mounting plane operably connected to the laser emitting unit, a first and a second electronic obliquity sensing units fixed on the first and the second mounting planes respectively, an automatic adjusting means, a first and a second surfaces both of which may contact with the settling surface of the laser alignment device, the first surface connecting moveably with the laser emitting unit by the automatic adjusting means, and a control circuit connecting electrically to the first and the second obliquity sensing units and the automatic adjusting means, in which at least the first one of the first and second obliquity sensing units is a double shaft obliquity sensing unit.

The laser alignment device of the present invention may be settled to a settling surface through two different surfaces, that is, the first surface and the second surface, so as to project not only a horizontal planar laser beam but also a vertical planar laser beam without an additional laser emitting unit, and thereby to extend the use range for the same laser alignment device. Furthermore, the laser alignment device of the present invention may sense automatically the deviating degree from the horizontal or vertical for the planar laser beam, so as to omit the step of adjusting the device manually which simplifies its operation.

In one preferred embodiment of the present invention, the first mounting plane is perpendicular to said second mounting plane. Using this structure, it is easy to fix the first and the second obliquity sensing units perpendicular to each other.

In one preferred embodiment of the present invention, the first surface and the second surface are perpendicular to each other.

In one preferred embodiment, the automatic adjusting means comprises a first motor and a second motor controlled by the control circuit.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
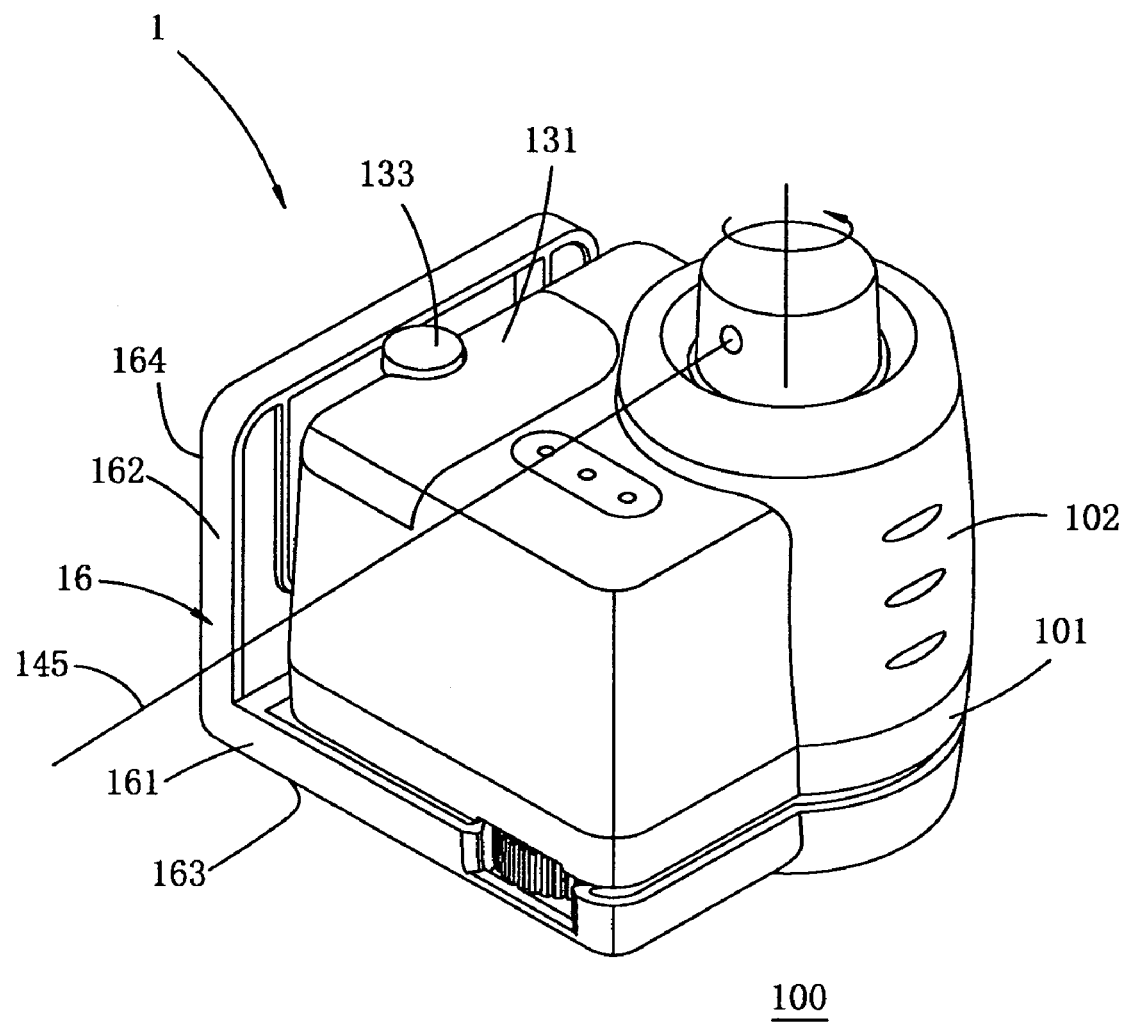
FIG. 1 is a perspective view of the laser alignment device in one preferred embodiment according to the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
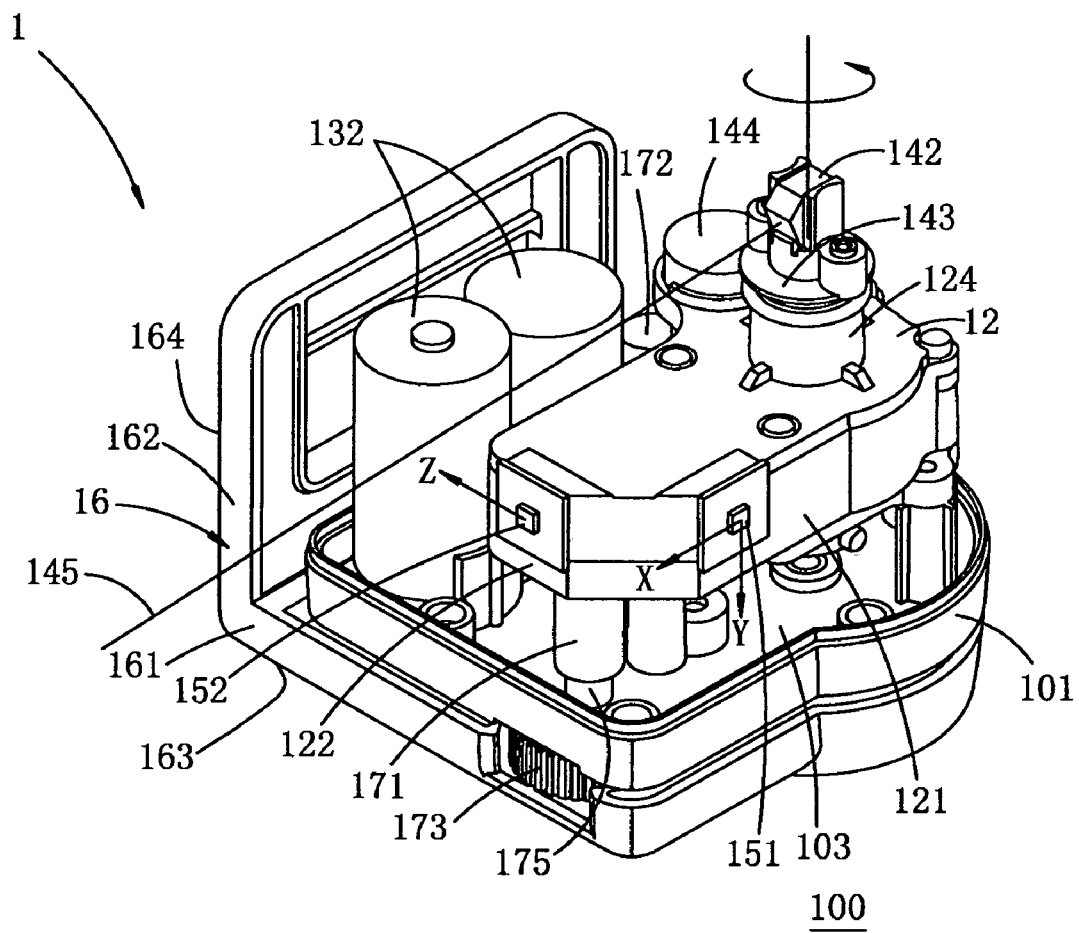
FIG. 2 is a perspective view of the laser alignment device in FIG. 1 with the upper casing removed.
Figure 3:
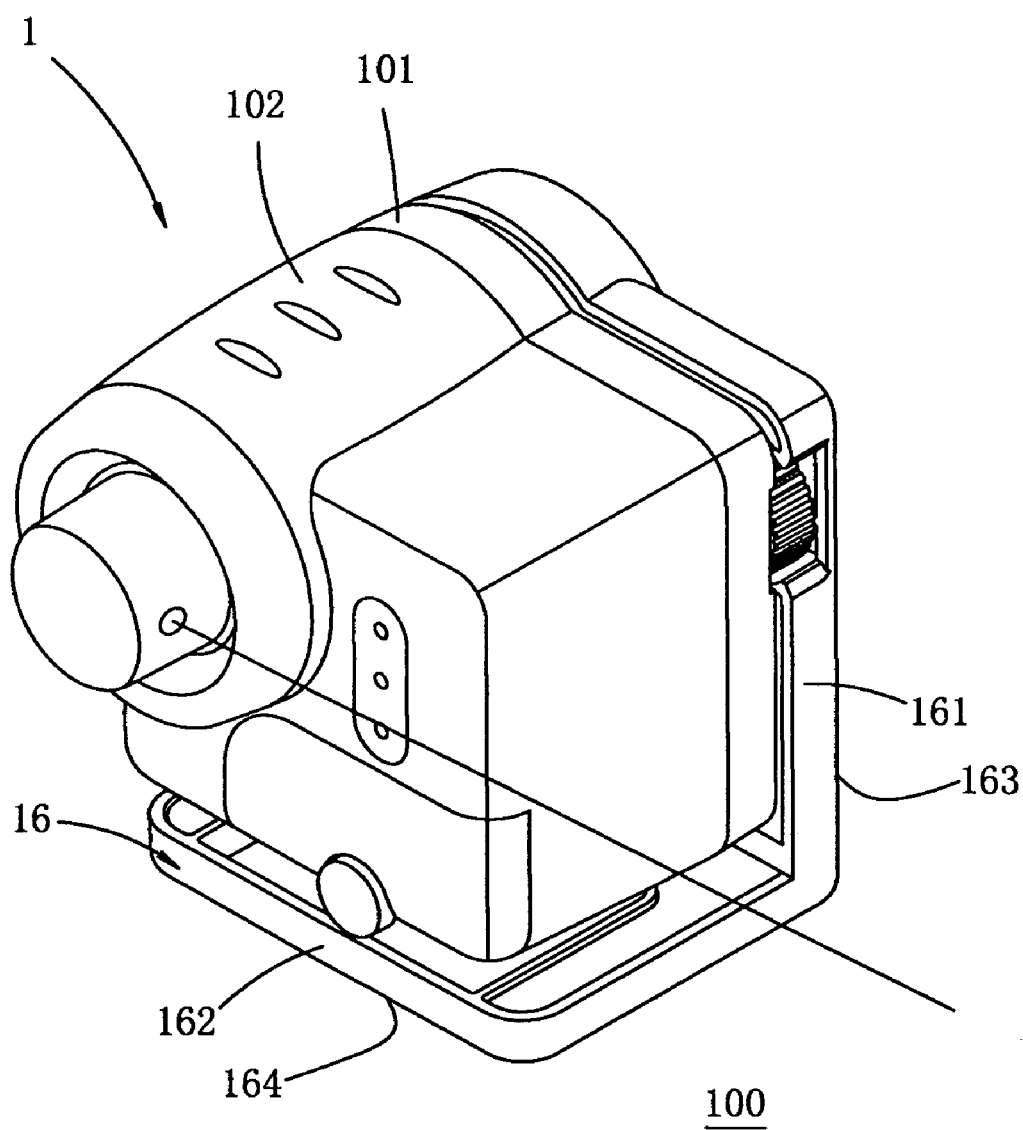
FIG. 3 is a perspective view of the laser alignment device in FIG. 1 from another point of view.

FIGS. 1-3 show a laser alignment device 1 of one preferred embodiment according to the present invention.

In one preferred embodiment, the laser alignment device 1 includes a bracket 16 and a casing composed of an upper casing 102 and a lower casing 101. A laser mounting frame 12 is provided in the casing. A laser emitting unit is fixed on the laser mounting frame 12. The bracket 16 includes a first support portion 161 and a second support portion 162 both of which are perpendicular to each other.

The two support portions 161 and 162 of the bracket 16 have outside surfaces 163 and 164, respectively. When the laser alignment device 1 is placed as shown in FIG. 1, the outside surface 163 of the support portion 161 is contacted with the settling surface 100. When the laser alignment device 1 is placed as shown in FIG. 3, the outside surface 164 of the support portion 162 is contacted with the settling surface 100.

The laser alignment device 1 further includes a first motor 171 and a second motor 172. The two motors 171 and 172 are fixed onto the lower casing 101. A length of thread portion is provided at the end of the output shaft 175 of the first motor 171, this output shaft 175 penetrates downward through the bottom plate 103 of the lower casing 101. A nut member 173 is fixed on the first support portion 161 of the bracket 16, and the thread portion of the output shaft 175 of the first motor 171 is contacted with the bolthole of the nut member 173. The first motor 171 rotates in positive or reverse direction to drive the output shaft 175 to rotate and move upward or downward relative to the first support portion 161 at the same time. Similarly, the thread portion at the end of the output shaft of the second motor 172 is contacted with a bolthole of another nut member (not shown in FIGS.) fixed on the first support portion 161. A universal pivot mechanism is also provided between the lower casing 101 and the first support portion 161 to connect them together. The pivot point of the universal pivot mechanism and the locations of the two motors present a triangle so that the casing may rotate upward or downward relative to the first support portion 161 of the bracket 16 around the pivot point of the universal pivot mechanism in two directions via the first motor 171 and the second motor 172, rotating in positive or reverse direction. The relative location between the casing and the first support portion 161 may be adjusted.

The laser emitting unit comprises a laser emitter (not shown in FIGS.) such as a semiconductor laser diode for generating a laser beam, an aligning lens (not shown in FIGS.), a pentaprism 142, a motor 144, and a belt pulley mechanism (not shown in FIGS.). The laser emitter and the aligning lens are mounted in the tubular protruding portion 124 of the laser mounting frame 12. The pentaprism 142 is fixed on the support member 143 and is mounted on the top of the tubular protruding portion 124, and which can rotate around the longitudinal axis of the tubular protruding portion 124. The motor 144 is fixed on the laser mounting frame 12, whose output shaft is connected with the support member 143 for supporting the pentaprism 142 through the belt pulley mechanism so that the motor 144 can drive the pentaprism 142 to rotate. When the laser alignment device 1 is placed as shown in FIG. 1 and FIG. 2, the laser emitter emits a laser beam upward which becomes an alignment laser beam after passing through the aligning lens, and then becomes a laser beam 145 at a shifted 90° angle after passing through the pentaprism 142. Then the motor 144 drives the fixing member 143 and the pentaprism 142 to rotate through the belt pulley mechanism so as to form a planar laser beam. It should be understood that the pentaprism 142 may be replaced by other optical elements such as a reflector, in which the reflecting surface is disposed at a 45° angle relative to the laser beam, and the like. Such a method and configuration in which the laser beam is driven by a motor to rotate so as to form a planar laser beam is disclosed in U.S. Pat. Nos. 4,031,629, 4,247,809 and 4,751,782, which are not described in detail herein. Certainly, in other embodiments, it may also use a linear lens instead of the motor rotation portion so as to simplify the internal structure of the laser alignment device.

The laser alignment device 1 includes further a battery cover 131 connected removably to the upper casing 102, and a dry battery 132 contained in the casings 102, 101 as a power supply. In other embodiments, the power supply may use other appropriate devices or elements that can provide electrical energy.

The laser alignment device 1 further includes a first obliquity sensing unit 151 and a second obliquity sensing unit 152, and a control circuit (not shown in FIGS.) connected with the two obliquity sensing units and the two motors. The two obliquity sensing units 151 and 152 are electronic obliquity sensing units, and are fixed on two planes 121 and 122 of the laser mounting frame 12, respectively. The two planes 121 and 122 are substantially perpendicular to each other. In the obliquity sensing units 151 and 152, at least the first one 151 is a double shaft obliquity sensing unit which can sense the slope degree of the two axes X and Y perpendicular to each other relative to the horizontal or vertical direction. The second obliquity sensing unit 152 can at least sense the slope degree of the axis Z relative to the horizontal or vertical direction.

During adjustment in manufacture, first, place the laser alignment device 1 as shown in FIG. 1, adjust the planar laser beam to be in horizontal direction, the control circuit records the X axis signal value in signals output from the first obliquity sensing unit 151 as an X axis horizontal reference value, and also records the Z axis signal value output from the second obliquity sensing unit 152 as a Z axis horizontal reference value. Then, place the laser alignment device 1 as shown in FIG. 3, adjust the planar laser beam formed to the vertical direction, the control circuit considers the Y axis signal value in signals output from the first obliquity sensing unit 151 as a Y axis horizontal reference value.

During practical use, when the laser alignment device 1 is placed as shown in FIG. 1, based on the difference between the value of X axis measurement signal in signals output from the first obliquity sensing unit 151 and the X axis horizontal reference value and the difference between the value of the Z axis measurement signal output from the second obliquity sensing unit 152 and the Z axis horizontal reference value, the control circuit outputs a corresponding electrical signal to control the first and the second motors 171, 172 to rotate in positive or reverse direction respectively until the value of X axis measurement signal is equal to the X axis horizontal reference value and the value of Z axis measurement signal is equal to the Z axis horizontal reference value, so as to adjust the planar laser beam to the horizontal direction. When the laser alignment device 1 is placed as FIG. 3, based on the difference between the value of Y axis measurement signal in signals output from the first obliquity sensing unit 151 and the Y axis horizontal reference value, the control circuit outputs a corresponding electrical signal to control the second motor 172 to rotate until the value of Y axis measurement signal is equal to the Y axis horizontal reference value, so as to adjust the planar laser beam to the vertical direction.

In other embodiments, the adjusting means are driven by the above motors and the laser emitting unit may also be disposed in a same casing that has two surfaces which are perpendicular to each other and contactable with the settling surface.

The present invention is not limited to the above preferred embodiment. It should be understood to a person skilled that many modifications and substitutions may be made to the laser alignment device of the present invention without departing from the spirit and scope of the present invention as defined by the appended claims.

While the specific embodiments have been illustrated and described, numerous modifications come to mind without significantly departing from the spirit of the invention, and the scope of protection is only limited by the scope of the accompanying Claims.

What is claimed is:

1. A laser alignment device, comprising:
   a casing;
   a laser emitting unit, the unit being mounted in the casing and may emit a planar laser beam;
   a first mounting plane and a second mounting plane connected fixedly to the laser emitting unit;
   a first electronic obliquity sensing unit fixed on the first mounting plane and a second electronic obliquity sensing unit fixed on the second mounting plane;
   an automatic adjusting means;
   a first surface and a second surface, the first surface and the second surface capable of contacting a settling surface of the laser alignment device, the first surface being moveably connected with the laser emitting unit by the automatic adjusting means, and a control circuit connected electrically with the first and second obliquity sensing units and the automatic adjusting means, wherein the first and second obliquity sensing units comprise a double shaft obliquity sensing unit.

2. The laser alignment device according to claim 1, wherein the first mounting plane is perpendicular to the second mounting plane.

3. The laser alignment device according to claim 1, wherein the first surface and the second surface are perpendicular to each other.

4. The laser alignment device according to claim 1, wherein the first obliquity sensing unit has a first obliquity measurement shaft and a second obliquity measurement shaft, the first and second measurements shafts perpendicular to each other.

5. The laser alignment device according to claim 1, wherein the automatic adjusting means comprises a first motor and a second motor controlled by the control circuit.

6. The laser alignment device according to claim 5, wherein the first motor has an end of an output shaft operably connecting the second motor by threaded portions.

7. The laser alignment device according to claim 6, wherein the laser alignment device further comprises a first nut and a second nut fixed relative to the first surface.

8. The laser alignment device according to claim 7, wherein thread portions of said first and second motors are contacted with the first and the second nuts, respectively.

9. The laser alignment device of claim 1, wherein the laser emitting unit is mounted in the casing.

10. The laser alignment device of claim 1, wherein the laser emitting unit is capable of emitting a planar laser beam.

11. A laser alignment device, comprising:
    a casing;
    a laser emitting unit;
    a first mounting plane and a second mounting plane operably connected to the laser emitting unit;
    a first electronic obliquity sensing unit fixed on the first mounting plane and a second electronic obliquity sensing unit fixed on the second mounting plane, the first and second obliquity sensing units comprising a double shaft obliquity sensing unit;
    an automatic adjusting means;
    a first surface and a second surface, the first surface and the second surface capable of contacting a settling surface of the laser alignment device, the first surface being moveably connected with the laser emitting unit by the automatic adjusting means, and a control circuit connected electrically with the first and second obliquity sensing units and the automatic adjusting means.

12. A laser alignment device, comprising:
    a casing;
    a laser emitting unit, the unit being mounted in the casing and may emit a planar laser beam;
    a first mounting plane and a second mounting plane connected fixedly to the laser emitting unit, the first mounting plane being perpendicular to the second mounting plane;
    a first electronic obliquity sensing unit fixed on the first mounting plane and a second electronic obliquity sensing unit fixed on the second mounting plane, the first obliquity sensing unit having two obliquity measurement shafts perpendicular to one another;
    an automatic adjusting means, the automatic adjusting means having a first motor and a second motor controlled by a control circuit, the first motor and the second motor the first motor having an end of an output shaft operably connecting the second motor by threaded portions;
    a first surface and a second surface, the first surface and the second surface being perpendicular to one another and capable of contacting a settling surface of the laser alignment device, the first surface being moveably connected with the laser emitting unit by the automatic adjusting means, and the control circuit connected electrically to the first and second obliquity sensing units and the automatic adjusting means, wherein the first and second obliquity sensing units comprise a double shaft obliquity sensing unit, wherein the first surface comprises a first nut and a second nut fixed to the first surface, wherein thread portions of the first motor and second motor are contacted with the first nut and second nut respectively.

* * * * *